June 3, 1930.  J. P. NORTHEY ET AL  1,761,581
MANUFACTURE OF KEY BOLTS
Filed March 14, 1928
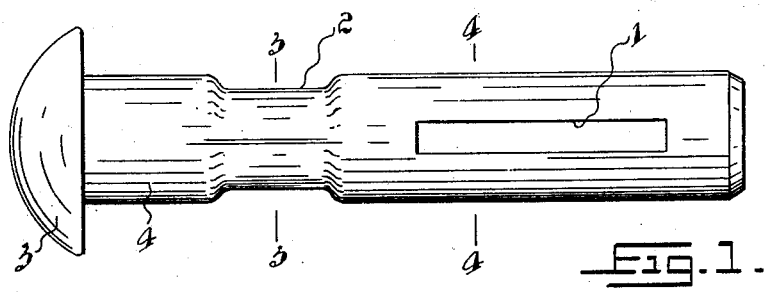
Fig.1.
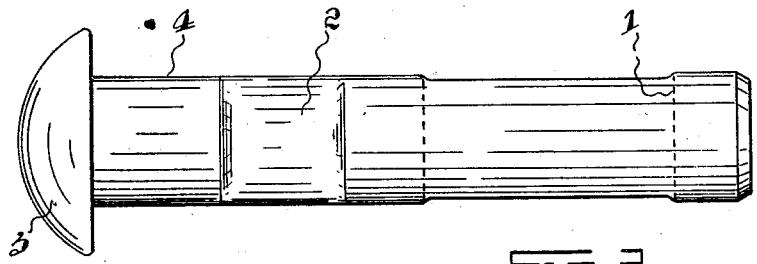
Fig.2.
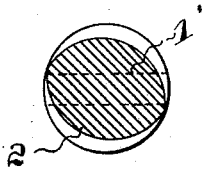   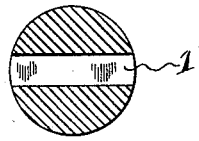
Fig.3.   Fig.4.
INVENTORS.
J. P. Northey
R. V. Northey
BY J. Edward Maybee
ATTY.

Patented June 3, 1930

1,761,581

UNITED STATES PATENT OFFICE

JOHN P. NORTHEY AND RODNEY V. NORTHEY, OF TORONTO, ONTARIO, CANADA

MANUFACTURE OF KEY BOLTS

Application filed March 14, 1928. Serial No. 261,565.

This invention relates to the manufacture of bolts of the type provided with a transverse slot for the passage of a wedge key, and more particularly to the manufacture of track bolts in which it is preferable to form the bolt with a neck adjacent the head, a slotted portion of the same diameter as the neck, and an intermediate portion of less diameter, and our object is to devise a method of making such a bolt which will enable us to cheaply produce bolts from solid cylindrical blanks.

We attain our object by punching out one end of a solid cylindrical blank to form a slot without increasing the diameter of the blank, by compressing the intermediate portion of the blank to reduce its diameter, and upsetting the end remote from the slot to form a head.

The invention is hereinafter more fully described, and is illustrated in the accompanying drawings in which Fig. 1 is a side elevation of a bolt produced in accordance with our invention;

Fig. 2 is a similar view at right angles to Fig. 1;

Fig. 3 is a section on the line 3—3 in Fig. 1; and

Fig. 4 is a section on the line 4—4 in Fig. 1.

In the drawings like numerals of reference indicate corresponding parts in the different figures.

The bolt is formed from a solid cylindrical blank of any suitable metal. This blank is clamped in any suitable holder and a slot 1 is formed in the same by punching out the metal, which is effected without materially increasing the diameter of the blank. Adjacent this slot the blank is compressed to reduce its diameter and cross sectional area, as shown at 2.

It is necessary that the diameter be reduced in a direction approximating the plane of the slot 1, but it is not necessary that the diameter be reduced in a direction at right angles to this plane.

In the drawings we show the reduction in diameter as effected only in a direction approximately parallel to the plane of the slot, but it will be understood, of course, that the reduction may be effected also in a direction at right angles thereto.

The reduction in diameter by compression results, of course, in slight elongation of the bolt.

When the bolt is intended for track purposes, a head 3 will be formed on the blank at the end remote from the slot.

In the case of a track bolt, the head will be spaced from the portion of reduced diameter to leave a neck 4 adjacent the head of substantially the original diameter or cross sectional area of the blank. We thus produce a bolt specially adapted for track purposes in which the neck and slotted portion each fit more or less snugly in the holes of angle bars, while the central portion of reduced diameter allows play between the bolt and the sides of the hole in the web of the rail through which the bolt is passed.

What we claim as our invention is:

1. A method of forming a key bolt which consists in taking a substantially cylindrical blank, punching out a longitudinal slot adjacent one end thereof without materially increasing the diameter of the blank, forming a head at the other end of the blank, and compressing a portion of the blank between the slot and head to reduce its cross sectional area by a decrease along one diameter while preventing increase in a direction at right-angles thereto.

2. A method of forming a key bolt which consists in taking a substantially cylindrical blank, punching out a longitudinal slot adjacent one end thereof without materially increasing the diameter of the blank, forming a head at the other end of the blank, compressing the blank intermediate its ends to reduce its cross sectional area by a decrease along one diameter while preventing increase in a direction at right-angles thereto, and leaving a neck adjacent the head of substantially the original diameter of the blank.

3. A method of forming a key bolt which consists in taking a solid substantially cylindrical blank, punching out a longitudinal slot adjacent one end thereof without materially increasing the diameter of the blank, forming a head at the other end of the blank, and compressing a portion of the blank between the slot and head ends to reduce its diameter approximately in the plane of the slot while preventing increase in its diameter in a direction at right angles thereto.

4. A method of forming a key bolt which consists in taking a substantially cylindrical blank, punching out a longitudinal slot adjacent one end thereof without materially increasing the diameter of the blank, forming a head at the other end of the blank, compressing the blank intermediate its ends to reduce its diameter approximately in the plane of the slot while preventing increase in its diameter in a direction at right angles thereto, and leaving a neck adjacent the head of substantially the original diameter of the blank.

5. A method of forming a key bolt which consists in taking a substantially cylindrical blank, punching out a longitudinal slot therein without materially increasing the diameter of the blank, and compressing a portion of the blank at one side of the slot to reduce its cross sectional area by a decrease along one diameter while preventing increase in a direction at right-angles thereto, at the same time leaving the end of the blank remote from the slot of substantially the original diameter.

6. A method of forming a key bolt which consists in taking a substantially cylindrical blank, punching out a longitudinal slot therein without materially increasing the diameter of the blank, and compressing a portion of the blank at one side of the slot to reduce its diameter approximately in the plane of the slot while preventing increase in its diameter in a direction at right angles thereto.

7. A method of forming a key bolt which consists in taking a substantially cylindrical blank, punching out a longitudinal slot adjacent one end thereof without materially increasing the diameter of the blank, forming a head at the other end of the blank, compressing the blank intermediate its ends to reduce its cross sectional area by a decrease along one diameter while preventing increase in a direction at right-angles thereto, and leaving a neck adjacent the head at least of substantially the same cross sectional area as the original cross sectional area of the blank.

8. A method of forming a key bolt which consists in taking a substantially cylindrical blank, punching out a longitudinal slot adjacent one end thereof without materially increasing the diameter of the blank while preventing increase in a direction at right-angles thereto, forming a head at the other end of the blank, compressing the blank intermediate its ends to reduce its diameter approximately in the plane of the slot without increasing its diameter in a direction at right angles thereto, and leaving a neck adjacent the head at least of substantially the same cross sectional area as the original cross sectional area of the blank.

Signed at Toronto this 22nd day of February, 1928.

JOHN P. NORTHEY.
RODNEY V. NORTHEY.